United States Patent
Okada (10) Patent No.: US 7,046,201 B2
(45) Date of Patent: May 16, 2006

(54) DIVERSITY ANTENNA APPARATUS

(75) Inventor: Hironori Okada, Gunma (JP)

(73) Assignee: Taiyo Yuden Co., Ltd., Tokyo (JP)

(*) Notice: Subject to any disclaimer, the term of this patent is extended or adjusted under 35 U.S.C. 154(b) by 90 days.

(21) Appl. No.: 10/821,580

(22) Filed: Apr. 9, 2004

(65) Prior Publication Data

US 2004/0227669 A1   Nov. 18, 2004

(51) Int. Cl.
*H01Q 1/38*   (2006.01)
*H01Q 1/24*   (2006.01)

(52) U.S. Cl. .............................. 343/700 MS; 343/702; 343/846

(58) Field of Classification Search ......... 343/700 MS, 343/702, 846, 848; H01Q 1/38, 1/24
See application file for complete search history.

(56) References Cited

U.S. PATENT DOCUMENTS

| | | | |
|---|---|---|---|
| 5,909,198 A * | 6/1999 | Mandai et al. | 343/895 |
| 6,686,886 B1 * | 2/2004 | Flint et al. | 343/702 |
| 6,697,019 B1 * | 2/2004 | Hyuk-Joon et al. | 343/700 MS |
| 6,808,642 B1 * | 10/2004 | Takaya et al. | 216/13 |

FOREIGN PATENT DOCUMENTS

| | | |
|---|---|---|
| JP | 62-114304 | 5/1987 |
| JP | 4-133502 | 5/1992 |
| JP | 10-112677 | 4/1998 |
| JP | 11-205032 | 7/1999 |
| JP | 11-215040 | 8/1999 |
| JP | 2001-345745 | 12/2001 |
| JP | 2002-505835 | 2/2002 |
| JP | 2003-8337 | 1/2003 |
| WO | WO 99/55012 | 10/1999 |

* cited by examiner

*Primary Examiner*—Hoanganh Le
(74) *Attorney, Agent, or Firm*—Knobbe Martens Olson & Bear, LLP

(57) ABSTRACT

In a diversity antenna apparatus, chip antennas are used as antenna elements, and the chip antennas are disposed in association with a ground pattern with certain gaps from the ground pattern. The chip antennas are disposed so as to surround the ground pattern formed on a substrate, and the ground pattern is shared among the chip antennas. Furthermore, hybrid patterns are included in the substrate, and the hybrid patterns also share the ground pattern with the chip antennas to achieve compact design. Alternatively, a transmitting chip antenna and a ground pattern associated with the transmitting chip antenna together form a vertically polarized antenna, and the transmitting chip antenna and the ground pattern associated with the transmitting chip antenna are separated from receiving chip antennas and a ground pattern associated with the receiving chip antennas.

21 Claims, 6 Drawing Sheets

| Distance | Angle | 1 RX Antennas | 2 RX Antennas | 3 RX Antennas | 4 RX Antennas | 5 RX Antennas |
|---|---|---|---|---|---|---|
| 10m | 0° | −60.72 | −58.60 | −57.53 | −56.86 | −56.39 |
|  | 90° | −62.22 | −60.04 | −58.93 | −58.22 | −57.72 |
|  | 180° | −59.24 | −57.27 | −56.23 | −55.49 | −54.90 |
|  | 270° | −60.26 | −58.76 | −58.24 | −58.00 | −57.85 |
| 35m | 0° | −66.99 | −64.69 | −63.51 | −62.79 | −62.34 |
|  | 90° | −65.34 | −63.53 | −62.75 | −62.30 | −61.92 |
|  | 180° | −65.66 | −64.03 | −63.17 | −62.61 | −62.22 |
|  | 270° | −63.11 | −61.03 | −59.99 | −59.29 | −58.76 |

Fig. 8

DIVERSITY ANTENNA APPARATUS

BACKGROUND OF THE INVENTION

1. Field of the Invention

The present invention relates to a diversity antenna apparatus that is used, for example, in radio communication systems.

2. Descripton of the Related Art

Recently, diversity antenna systems are being researched with the aim of achieving improved quality of radio communications. Examples of known diversity antennas include the following.

In an antenna device disclosed in Japanese Unexamined Patent Application Publication No. 10-112677, as shown in FIG. 1 of the document, two monopole antennas are disposed on a 90° hybrid substrate with a gap of 3λ/4, where λ denotes a wavelength associated with a resonant frequency. In the antenna device, phases of voltages supplied to a hybrid are changed to control directivity.

In an antenna device disclosed in Published Japanese Translation of a PCT Application, No. 2002-505835, as shown in FIG. 4 of the document, a plurality of printed-pattern antennas is formed on a single substrate, and the substrate is used in a system shown in FIG. 2 of the document. Also in the art disclosed in the document, directivity is controlled using a hybrid.

Japanese Unexamined Patent Application Publication No. 62-114304 and Japanese Unexamined Patent Application Publication No. 4-133502 disclose arrangements in which a plurality of antennas is disposed on a substrate and in which directivity is changed based on gaps among the antennas and phase differences of voltages.

Japanese Unexamined Patent Application Publication No. 11-205032 and Japanese Unexamined Patent Application Publication No. 2001-345745 disclose arrangements in which ground is shared among a plurality of antennas.

In a microstrip antenna disclosed in Japanese Unexamined Patent Application Publication No. 2003-8337, a ground conductor that is substantially square and planar is disposed so that the four edges thereof extend in a horizontal or vertical direction, and a planar radiating element is disposed so as to overlap a side surface of the ground conductor via a dielectric member, so that emission of linearly polarized waves, at least one of the vertically polarized waves and horizontally polarized waves, is allowed. With the microstrip antenna, uniformity between a transmission/reception area for horizontally polarized waves and a transmission/reception area for vertically polarized waves is achieved.

Japanese Unexamined Patent Application Publication No. 11-215040 discloses an arrangement in which a vertically polarized antenna and a horizontally polarized antenna are disposed on a single substrate and in which separate grounds are provided for the respective antennas.

However, the arrangements disclosed in the documents mentioned above are either a planar antenna in which an antenna element that functions as a radiating element is disposed on an antenna ground, composing a micro strip structure in cooperation with each other, or a pole antenna in which a radiating element is disposed vertically with respect to an antenna ground. This has imposed restrictions on reducing the thickness and size of antennas.

More specifically, in the planar antenna, its efficiency is determined by the size of an opposing area at which the antenna element overlaps the ground pattern, so that a certain size of opposing area is needed to achieve desired efficiency. In a pole antenna, a three-dimensional space is needed for the vertical portion, so that the antenna inevitably occupies a relatively large space.

Furthermore, the antenna devices according to the No. 11-215040 and No. 2003-8337 are not sufficient for use in multipath environments, because they do not disclose the relation between vertical/horizontal polarization and a transmitting/receiving antenna setting. This aspect is peculiar to an embodiment of the present invention. Especially, No. 2003-8337 discloses the use of vertical/horizontal polarization in order to correspond to both a vertical polarization service area and a horizontal polarization service area. Therefore, No. 2003-8337 does not have the specific setting of an embodiment of the present invention in which vertical polarization is applied to the transmitting antenna.

SUMMARY OF THE INVENTION

Accordingly, in an embodiment, an object of the present invention is to provide a compact diversity antenna apparatus.

Another object of the present invention in an embodiment is to provide a diversity antenna apparatus that is suitable for use in multipath environments.

One approach to achieve the first object described above is to employ a coplanar antenna in which an antenna element and a ground pattern are disposed on the same plane or substantially on the same plane, so that very little space is needed in the height direction. However, an area of a certain size is needed to dispose the antenna element and the ground pattern together. Since the entire area including the antenna element and the ground pattern affects electrical efficiency, the antenna element can have a small size compared with a case of a planar antenna, serving to reduce the size of the two-dimensional area of an antenna element. Therefore, the total area for arranging a plurality of antenna elements can be decreased. Another approach to achieve further reduction in size is to share a ground pattern among a plurality of antenna elements included in the diversity antenna apparatus. However, since certain gaps are needed between the ground pattern and the antenna elements in a coplanar antenna, a ground pattern cannot be shared by the same method as in a planar antenna or a pole antenna. Accordingly, the present invention includes, but is not limited to, the following arrangements.

A diversity antenna according to a first aspect of the present invention comprises a plurality of antenna elements (e.g., at least two including 3, 4, 5, 6, 7, 8, 9, and 10) disposed on a substrate, among which switching is allowed for diversity control; and a ground pattern formed in or on the substrate, the ground pattern functioning as a antenna ground for each of the antenna elements, wherein the ground pattern is formed at a central region of the substrate with a gap from each of the antenna elements, and the antenna elements are disposed on the substrate along outer edges of the substrate so as to surround the ground pattern.

The ground pattern can be comprised of multiple segments separated from each other (these segments may be connected to a common ground pattern provided outside this apparatus, e.g., an analog ground for an RF circuit or a digital ground for a processor or a frame ground), although the ground pattern may preferably be a single piece in view of antenna efficiency. When the diversity device comprises at least one transmitting antenna and at least one receiving antenna, the ground pattern are comprised of at least two segments (one for transmitting and the other for receiving)

separated from each other. These segments may be connected to a common ground pattern.

In the above, the antenna elements may surround the ground pattern if the antenna elements are disposed outside an outer periphery of the ground pattern, including embodiments where (a) multiple antenna elements are disposed exclusively along one side of the outer periphery of the ground pattern, (b) multiple antenna elements are disposed exclusively along two sides of the outer periphery of the ground pattern, which sides are opposed to each other, (c) multiple antenna elements are disposed exclusively along two sides of the outer periphery of the ground pattern, which sides are connected to each other, (d) multiple antenna elements are disposed along all of the sides of the outer periphery of the ground pattern. For example, if two antenna elements are used, one element can be disposed along one side of the outer periphery of the ground pattern, the other can be disposed along (i) the same side of the outer periphery, (ii) a side opposed to the first side, or (iii) a side adjacent to the first side. Preferably, no antenna element may be disposed within the ground pattern. As explained above, the shape of the ground pattern may be defined by its outer periphery of the ground pattern as a whole even if the ground pattern is comprised of multiple segments or is regular or irregular polygonal or is circular pattern.

The type of the antenna elements may be monopole, inverse L, inverse F, meandered, or the like, as long as the antenna elements and the ground pattern are disposed substantially on the same plane. The antenna elements (e.g., a chip-type antenna) and the ground pattern may be considered to be disposed substantially on the same plane as long as the antenna elements and the ground pattern can establish an electromagnetic coupling, rather than a radiating function achieved by a strip line structure, even if the antenna elements and the ground pattern are not leveled (e.g., a difference of 0–500 μm in height can be acceptable without reducing efficiency, and in an embodiment, the antenna substrate is composed of multi-layered ceramic substrates which are ceramic sheets having about 30 μm in thickness; resin substrate having 1.0–2.0 mm in thickness can be used for antenna substrate). When inverse F antenna elements are used, a shorted element of an inverse-F antenna may be grounded to a ground pattern, so that a gap between a radiating element of the inverse-F antenna and the ground pattern can be reduced. Any suitable structure of such a coplanar inverse-F antenna can be used including those well known in the art, so that detailed description will be omitted in this specification.

The antenna elements may be disposed with mutual gaps that are not smaller than one quarter of a wavelength associated with a resonant frequency.

The antenna elements may be rectangular chip antennas, wherein the chip antennas are disposed with lengthwise directions thereof extending along adjacent edges of the substrate. The arrangements of the chip antennas may include two or more arrangements including a first arrangement in which a chip antenna is disposed laterally along a first edge of the substrate, and a second arrangement in which a chip antenna is disposed longitudinally along a second edge of the substrate, wherein. the second edge is perpendicular to the first edge.

The antenna elements may be chip antennas having element tips, (i.e. the open end of the element) extending. in a common direction as viewed from within the ground pattern, with the ground pattern formed such that a space is provided in the direction of the element tip of each of the chip antennas.

The substrate may further comprise a hybrid pattern that is connected to at least two of the plurality of antenna elements.

The substrate may be composed of a lamination of a hybrid layer including the hybrid pattern, a connecting layer including a connecting pattern for connecting the hybrid pattern to an external port, and a ground layer including the ground pattern, the hybrid layer and the connecting layer sandwiching the ground layer to form a microstrip-line structure and sharing the ground layer with the plurality of antenna elements.

A diversity antenna according to a second aspect of the present invention comprises a plurality of antenna elements disposed on a substrate, among which switching is allowed; and a ground pattern formed in the substrate, the ground pattern functioning as a ground for each of the plurality of antenna elements, wherein the ground pattern is formed in a central region of the substrate with a gap from each of the antenna elements, the antenna elements are disposed on the substrate so as to surround the ground pattern, and the ground pattern and the antenna elements are disposed in parallel to a mounting surface of the substrate. In an embodiment, the ground pattern and/or the antenna elements can be disposed perpendicular to or angled against the mounting surface of the substrate. The disposing direction of the ground pattern and the antenna elements can be determined based on their longitudinal direction.

The plurality of antenna elements may include an antenna element dedicated for transmitting and an antenna element dedicated for receiving.

The antenna element dedicated for transmitting may function as a vertically polarized antenna. Accordingly, improvement in characteristics that has not been possible is achieved. The idea of the antenna dedicated for transmitting using vertically polarized waves is an effective for use in multipath environments.

The ground pattern may include a first region that functions as a ground for the antenna element dedicated for transmitting and a second region that functions as a ground for the antenna element dedicated for receiving.

The first region may extend in a vertical direction. In that case, the ground pattern for the antenna-element dedicated for transmitting may be elongated in a lengthwise direction that is perpendicular to the earth.

Furthermore, the present invention includes an embodiment using an antenna element dedicated for transmitting and an antenna element dedicated for receiving. Accordingly, an arrangement of antenna element suitable for receiving and an arrangement of antenna element suitable for transmitting can be prepared separately, serving to allow operation in multipath environments. More specifically, the present invention includes, but is not limited to, the following arrangements.

A diversity antenna apparatus according to a third aspect of the present invention comprises a plurality of antenna elements disposed on a substrate, among which switching is allowed; and a ground pattern formed in the substrate, the ground pattern functioning as a ground for each of the plurality of antenna elements, wherein the plurality of antenna elements comprises an antenna element dedicated for transmitting and an antenna element dedicated for receiving.

In view of the foregoing, according to an embodiment of the present invention, a compact diversity antenna apparatus can be provided.

Also, according to an embodiment of the present invention, a diversity antenna apparatus that is suitable for use in multipath environments can be provided. In the foregoing, elements and explanation in each aspect can be interchangeably used in another aspect.

For purposes of summarizing the invention and the advantages achieved over the related art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention.

DETAILED DESCRIPTION OF THE PREFERRED EMBODIMENT

Now, preferred embodiments of the present invention will be described in detail with reference to the drawings, although the present invention should not be limited thereto.

Figure 1:
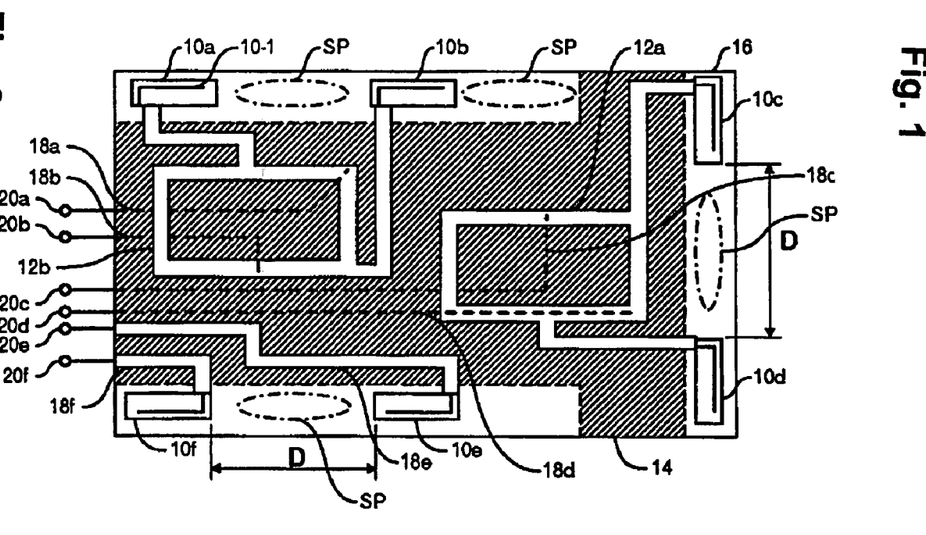
FIG. 1 is a top view of a diversity antenna apparatus according to a first embodiment of the present invention.

FIG. 1 is a plane view showing the structure of an antenna substrate in a diversity antenna apparatus according to a first embodiment of the present invention. Referring to FIG. 1, the antenna substrate according to this embodiment includes hybrid patterns 12a and 12b, a ground pattern 14, and connecting patterns 18a to 18f that are formed in a printed board 16 comprising at least one layer, for example, three layers. On a top surface of the antenna substrate, a plurality of chip antennas 10a to 10f is mounted. That is, the chip antennas 10a to 10f, i.e., antenna elements, and the ground pattern are disposed substantially on the same plane. Thus, very little space is needed in the height direction.

Each of the chip antennas 10a to 10f may comprise an element 10-1 formed on a dielectric substrate composed of, for example, a ceramic material, and may be disposed with a certain gap from the ground pattern 14 which inhibits impedance mismatching. The type of the chip antennas 10a to 10f can be any suitable antennas including monopole, inverse L, inverse F, meandered, or the like.

In this embodiment, each of the chip antennas 10a to 10f is rectangular in shape, and is disposed with a lengthwise direction thereof extending along both an edge defining the ground pattern 14 and an edge defining the printed board 16 so that a maximum number of chip antennas can be disposed.

Although the larger the gaps between the chip antennas 10a to 10f and the ground pattern 14, the better the transmitting/receiving efficiency becomes, preferably it may be minimized without causing impedance mismatching, so that the device can be downsized. The desired distance depends on the type of the antennas. For example, in the case of inverse-F antennas, the distance can be as small as approximately 1 mm (e.g., at 2 GHz Band).

According to the arrangement described above, the chip antennas 10a to 10f are disposed along the outer edges of the printed board 16 so as to surround the ground pattern 14. Thus, a maximum number of antennas can be disposed with the antennas sharing a single ground pattern. That is, a plurality of antennas functions using the entire periphery of the ground pattern.

From the perspective of preventing mutual interference, preferably, a gap D between each set of chip antennas among the chip antennas 10a to 10f (at least a gap between chip antennas adjacent to each other with respect to the lengthwise direction among the chip antennas 10a to 10f) may be chosen to be not smaller than $\lambda/2$ in an embodiment, where $\lambda$ is a wavelength associated with a resonant frequency of the chip antennas. Practically, however, the gap can be as small as $\lambda/4$ in an embodiment. Thus, in order to achieve a compact design while suppressing mutual interference, a gap of $\lambda/4$ is preferable, but the gap is not limited to this specific length.

Furthermore, in order to achieve an increased variety of directivity patterns by diversity, the chip antennas 10a to 10f are preferably disposed such that tips of the elements 10-1 thereof are directed in the same direction along the edges of the printed board 16, as viewed from within the ground pattern 14. More preferably, the arrangements of the chip antennas 10a to 10f include at least two arrangements, i.e., a first arrangement in which a chip antenna is disposed in a lateral direction along a first edge of the printed board 16 and a second arrangement in which a chip antenna is disposed in a longitudinal direction along a second edge of the printed board 16, wherein the second edge is perpendicular to the first edge.

Also, in order to suppress mutual interference among the chip antennas 10a to 10f, the chip antennas 10a to 10f are preferably disposed such that the tips of the elements 10-1 thereof are directed in the same direction, along the edges of the printed board 16 as viewed from within the ground pattern 14, with spaces SP provided in the directions of the element tips of the chip antennas 10a, 10b, 10c, and 10e. With regard to the chip antennas 10d and 10f, spaces are not particularly needed since the printed board 16 is absent in the directions of the element tips of the chip antennas 10d and 10f. Furthermore, although a region where the ground pattern 14 is absent exists above the chip antenna 10e as viewed in FIG. 1, that is, in a direction opposite to the direction of the tip of the element of the chip antenna 10e, the ground pattern may also cover this region.

The hybrid patterns 12a and 12b, similarly to the hybrid patterns in the art disclosed in Japanese Unexamined Patent Application Publication No. 10-112677 described earlier, are used to give a phase difference between applied voltages, and are implemented by 180° hybrid patterns in this embodiment. Methods of designing hybrid patterns are well known, so that hybrid patterns can be designed by those skilled in the art with reference to known technical information.

The connecting patterns 18a to 18d are conductive patterns each used to connect a hybrid pattern to one of external ports 20a to 20d, and is included in a lowermost layer in this embodiment. The connecting pattern 18e is a conductive pattern for connecting the chip antenna 10e to an external port 20e. The connecting pattern 18f is a conductive pattern for connecting the chip antenna 10f to an external port 20f.

Figure 2:
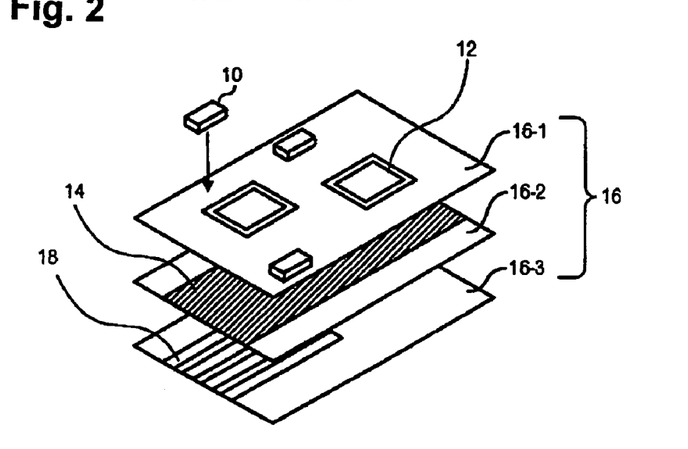
FIG. 2 is a perspective view showing the layer structure of an antenna substrate according to the first embodiment of the present invention.

FIG. 2 is a schematic exploded perspective view showing the layer structure of the antenna substrate shown in FIG. 1. As shown in FIG. 2, the printed board 16 includes a hybrid layer 16-1, a ground layer 16-2, and a connecting layer 16-3, in that order from top to bottom. The hybrid layer 16-1 includes the connecting patterns 18e and 18f and the hybrid patterns 12a and 12b. The ground layer 16-2 includes the ground pattern 14. The connecting layer 16-3 includes the connecting patterns 18a to 18d. The chip antennas 10a to 10f are mounted on top of the hybrid layer 16-1.

Accordingly, the hybrid layer 16-1 and the connecting layer 16-3 sandwich the ground layer 16-2, whereby a microstrip line structure is formed. Thus, the ground pattern 14 is shared among the chip antennas 10a to 10f, the hybrid patterns 12a and 12b, and the connecting patterns 18a to 18f. Accordingly, antenna function and hybrid function are implemented on a single substrate with a minimum layer structure.

The laminate structure is not limited,to the three-layer structure. When a one-layer structure is used, a hybrid pattern and a connecting pattern may be formed on one side of a single substrate, and a ground pattern may be formed on the reverse side of the substrate. In this case, the substrate may a printed board made of a resin material such as FR-4 (each of substrates 16-1, 16-2, and 16-3 shown in FIG. 2 may be made of a ceramic material such as dielectric oxide) so that patterns can be printed on both sides of the substrate, thereby forming a strip line structure. When a two-layer structure is used, a hybrid pattern and a connecting pattern may be formed on an upper layer, and a ground pattern may be formed on a lower layer. When a structure having more than three layers is used, any of the foregoing structures can be used as one set, and as many sets as desired can be laminated.

Figure 3:
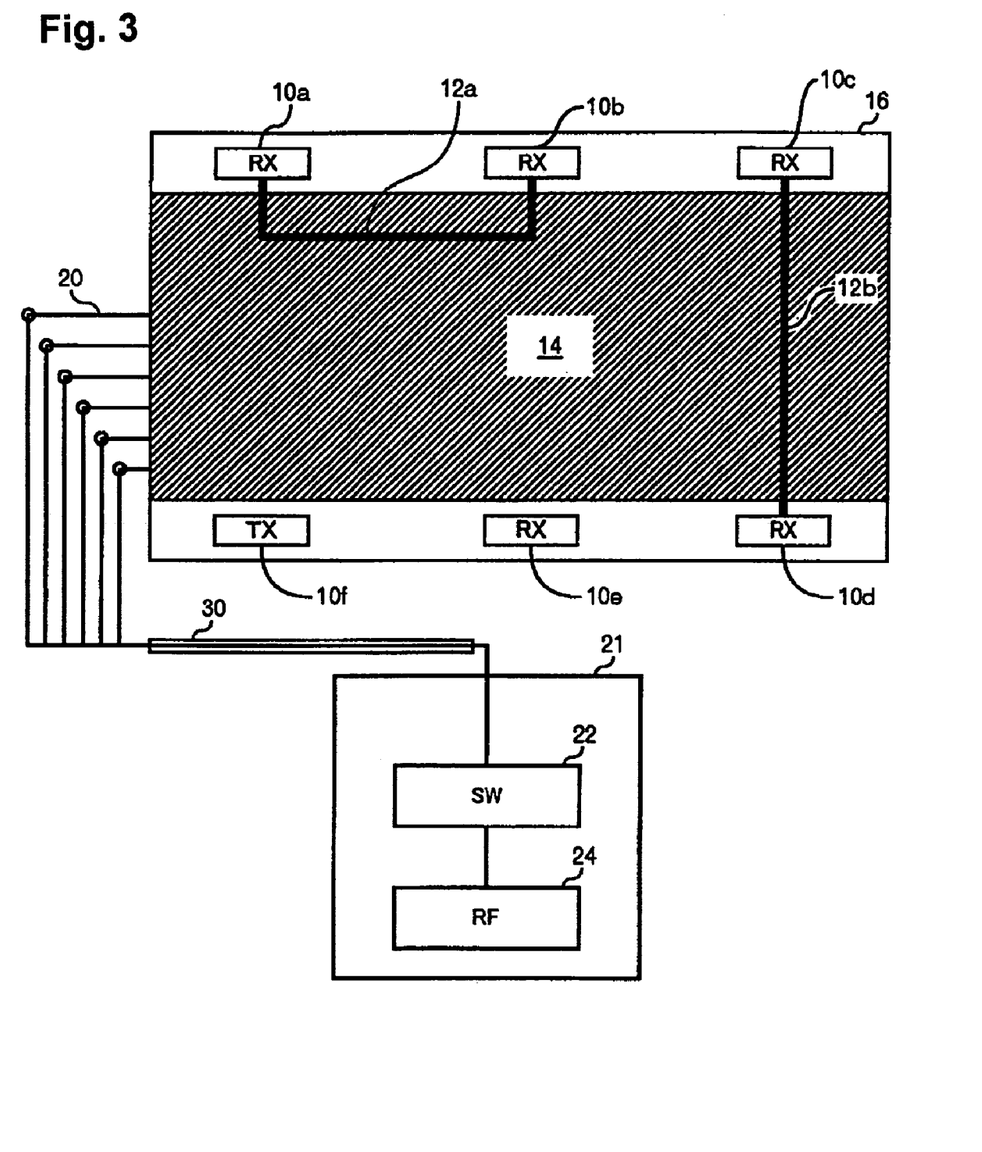
FIG. 3 is a schematic diagram showing an arrangement in which the antenna substrate according to a modified first embodiment of the present invention is connected to a communication device.

FIG. 3 is a schematic diagram showing an arrangement where the antenna substrate is connected to a communication device. As shown in FIG. 3, the antenna substrate has external ports 20 (20a to 20f) connected to a communication device 21 via a coaxial cable 30.

The communication device 21, similarly to the arrangement disclosed in Published Japanese Translation of a PCT Application, No. 2002-505835, described earlier, includes a switch 22 and an RF circuit 24 so that selective switching among the plurality of chip antennas 10 mounted on the antenna substrate is allowed. This allows diversity directivity control.

The chip antennas 10a to 10f mounted on the substrate includes six antennas in total, for example, five receiving antennas RX and one transmitting antenna TX, based on specifications determined for the communication device 21. The hybrid patterns 12a and 12b are each used by a pair of receiving antennas. More specifically, the chip antennas 10a and 10b are connected to the hybrid pattern 12a, and the chip antennas 10c and 10d are connected to the hybrid pattern 12b. In FIG. 3, the hybrid patterns 12a and 12b are shown in a simplified form. The chip antennas 10e and 10f are used individually. The number of chip antennas and specifications for transmitting and receiving can be changed in accordance with specifications required by the communication device 21. In FIG. 3, the shape of the ground pattern 14 and the arrangement of the chip antennas 10a to 10f slightly differ from those shown in FIG. 1. More specifically, the ground pattern 14 is rectangular, and the chip antennas 10a to 10f are simply disposed in parallel to an upper edge and a lower edge of the printed board 16.

FIGS. 4A to 4E are schematic diagrams showing variations of arrangement of the chip antennas 10a to 10f on the antenna substrate according to this embodiment. As shown in FIGS. 4A to 4E, various forms of connection of the chip antennas 10a to 10f and the hybrid patterns 12a and 12b are possible. In FIGS. 4A to 4E, the hybrid patterns 12a to 12b are shown in a simplified form.

Figure 4A:
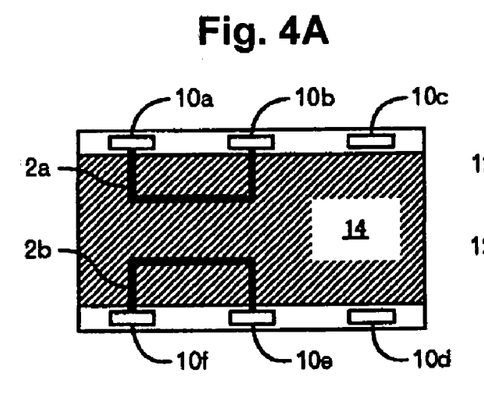
FIGS. 4A to 4E are schematic diagrams showing examples of arrangement of chip antennas in modified first embodiments of the present invention.

FIG. 4A shows an example where the ground pattern 14 is strip-shaped and the chip antennas 10a to 10f are disposed along the lengthwise direction of the ground pattern 14. In this example, two among three chip antennas disposed on one side of the ground pattern 14, i.e., the chip antennas 10a and 10b, are connected to each other by the hybrid pattern 12a. Also, two among three chip antennas disposed on the opposing side of the ground pattern 14, i.e., the chip antennas 10e and 10f, are connected to each other by the hybrid pattern 12b.

Figure 4B:
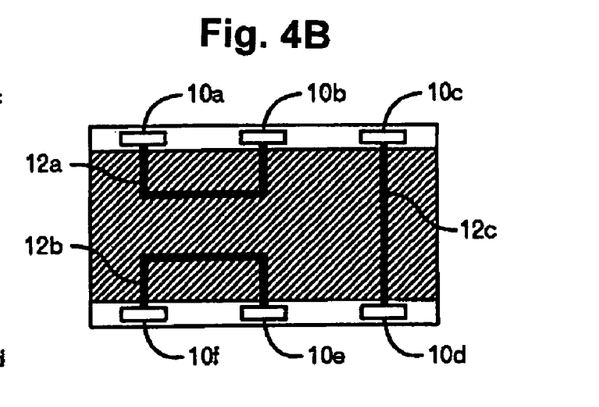
Figure 4C:
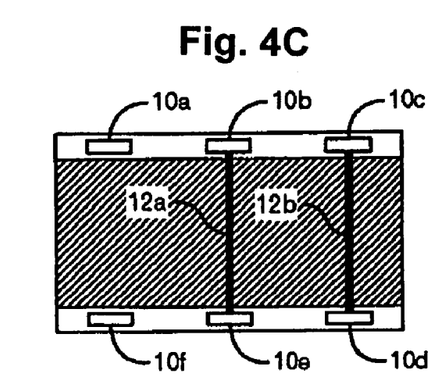
Figure 4D:
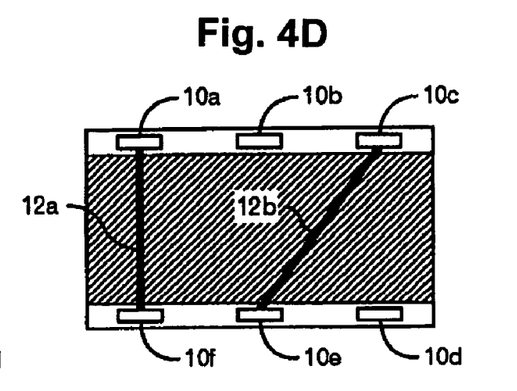
Figure 4E:
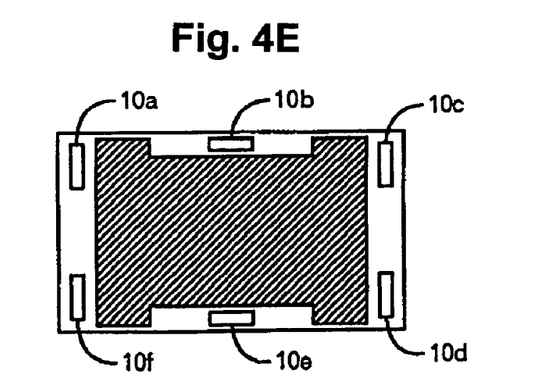

According to this embodiment, various other arrangements are also possible, as shown in FIGS. 4B to 4E. FIG. 4B shows an example where in addition to the structure shown in FIG. 4A, the other chip antennas 10c and 10d are connected to each other by a hybrid pattern 12c, whereby three hybrids are formed. FIG. 4C shows an example where chip antennas disposed on both sides of the ground pattern 14, i.e., the chip antennas 10b and 10e and the chip antennas 10c and 10d, are connected to each other by the hybrid patterns 12a and 12b, respectively. FIG. 4D shows an example where chip antennas that are disposed diagonally, i.e., the chip antennas 10c and 10e, are connected to each other by the hybrid pattern 12b. In FIG. 4D, the pair of chip antennas 10a and 10f is not disposed diagonally; however, another pair of diagonally disposed chip antennas, for example, chip antennas 10b and 10f, may be connected by the hybrid pattern 12a. FIG. 4E shows an example where some chip antennas are disposed longitudinally and other chip antennas are disposed laterally. More specifically, the chip antennas 10a an d 10f are disposed such that the longer axes thereof are parallel to the left edge of the printed board 16, the chip antennas 10b and 10e are disposed such that the longer axes thereof are parallel to the upper edge or the lower edge of the printed board 16, and the chip antennas 10c and 10d are disposed such that the longer axes thereof are parallel to the right edge of the printed board 16. The ground pattern 14 has a shape of the letter H.

Figure 5A:
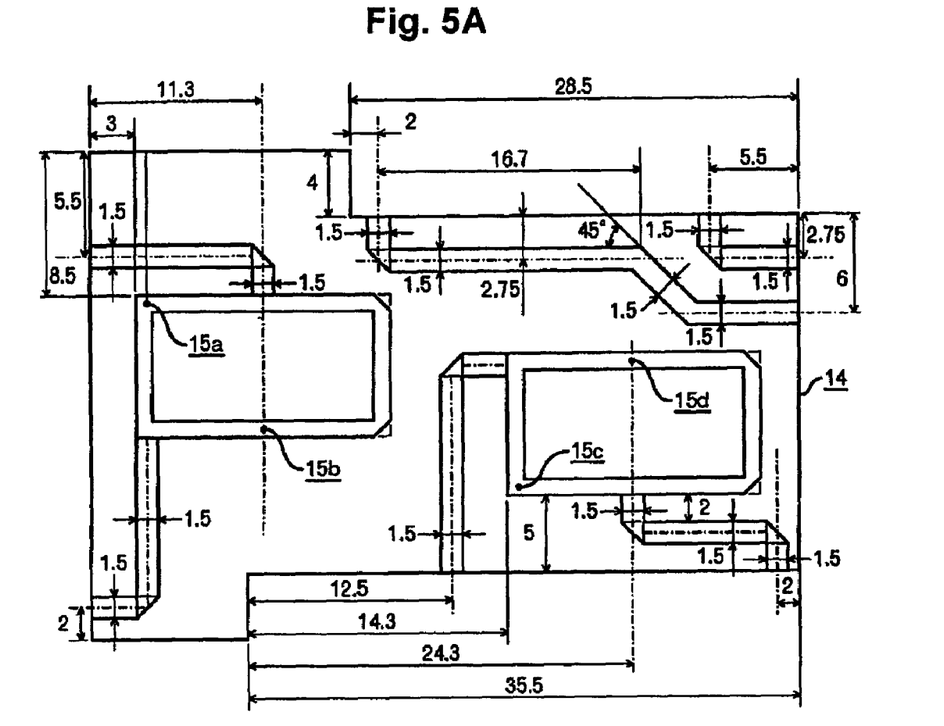
FIGS. 5A and 5B are diagrams showing specific examples of configurations of the layers of the antenna substrate.
Figure 5B:
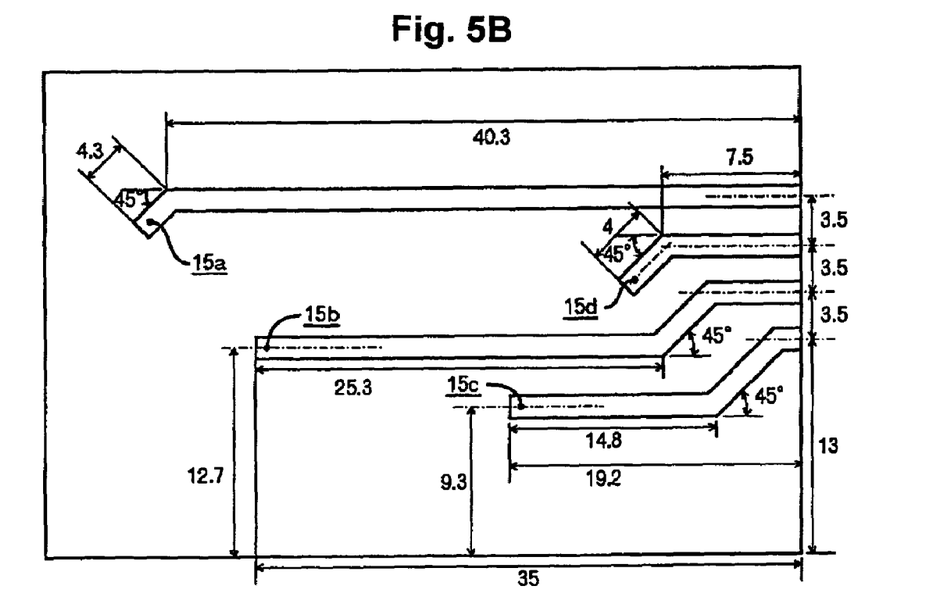

FIG. 5A is a top view showing a specific example of configuration of the hybrid layer 16-1 shown in FIG. 2 in the embodiment shown in FIG. 1. Note, however, that the outermost line represents the shape of the ground pattern 14 in the ground layer 16-2. Numerals other than underlined reference numerals represent dimensions in mm. FIG. 5B is a top view showing a specific example of configuration of the connecting layer 16-3 shown in FIG. 2 in the embodiment shown in FIG. 1. The hybrid layer 16-1 and the connecting layer 16-3 are connected to each other via through holes 15a to 15d without contacting the ground layer 16-2. The size of the printed board 16 shown in FIG. 5B may be about 30 mm×about 50 mm, the width of the ground pattern 14 may be about 46 mm, and the size of the chip antennas 10a to 10f may be about 8 mm×about 4 mm. When the antenna substrate is made of ceramic material, the thickness of one ceramic sheet may be about 30 μm. In an embodiment, dummy layers which have no patterns formed thereon may be used, and the total thickness may be designed to be about 0.5 mm to about 1.0 mm. The antenna substrate can be composed of three patterned resin substrates.

Next, a second embodiment of the present invention will be described with reference to FIGS. 6 to 8. The second embodiment differs from the first embodiment in that separate ground patterns 14b and 14a are provided respectively for a transmitting chip antenna 10a and receiving chip antennas 10b to 10f, and in that the transmitting chip antenna 10a and the ground pattern 14b together form a vertically polarized transmitting antenna. Although, in an embodiment, a receiving antenna or antennas can be vertically polarized, preferably, a transmitting antenna or antennas are vertically polarized. The receiving antenna can be either vertically or horizontally polarized.

Figure 6:
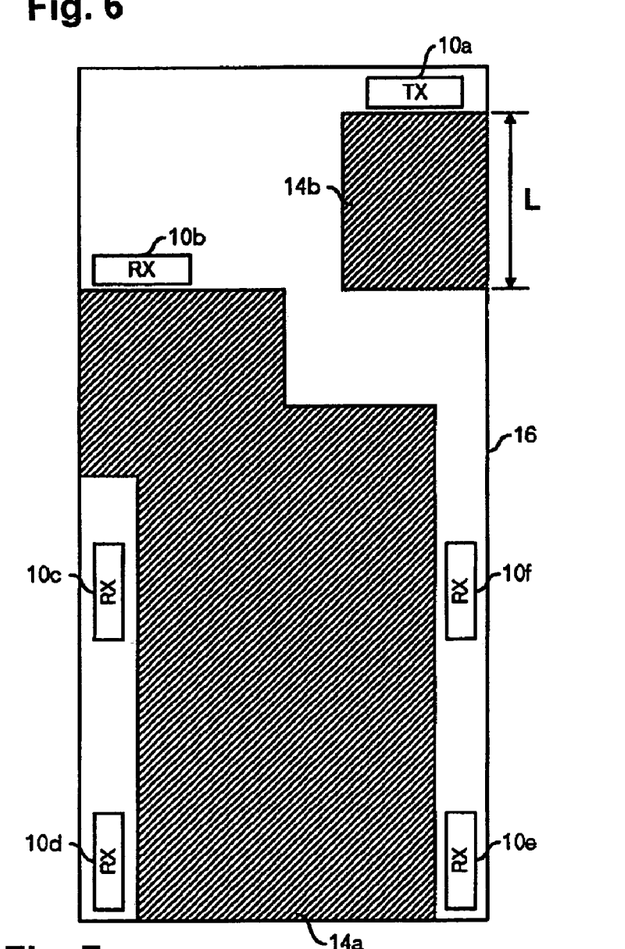
FIG. 6 is a schematic top view of a diversity antenna apparatus according to a second embodiment of the present invention.

As shown in FIG. 6, receiving chip antennas 10b to 10f are disposed along the outer edges of the printed board 16 so as to surround a receiving ground pattern 14a provided in a substantially central region of the printed board 16, with certain gaps from the ground pattern 14a. The receiving chip antenna 10b is disposed such that a shorter edge thereof, instead of a longer edge thereof, extends along an outer edge of the printed board 16. This is because the receiving chip antenna 10b may preferably be separated by certain distances from the transmitting chip antenna 10a and the ground pattern 14b. However, as long as the ground pattern 14a and the ground pattern 14b are separated, no restriction may be imposed on the shape of each pattern and on the layout of the chips. The gap between the receiving chip antennas 10c and 10d and the gap between the receiving chip antennas 10e and 10f are not smaller than λ/4, as in the arrangement shown in FIG. 1. Although not shown, in the receiving chip antennas 10c and 10d, the tips of the antenna elements thereof are directed upward as viewed in FIG. 6. In the receiving chip antenna 10b, the tip of the antenna element thereof is directed rightward as viewed in FIG. 6. In the receiving chip antennas 10f and 10e, the tips of the antenna elements thereof are directed downward as viewed in FIG. 6. That is, the tips of the antenna elements are directed rightward as viewed from within the ground pattern 14a.

Although connections of hybrid patterns for the receiving chip antennas 10b to 10f are not shown, the chip antennas 10b to 10f can be combined as desired, and a hybrid pattern may be connected to each set of chip antennas.

The ground pattern 14a is shared among the receiving chip antennas 10b to 10f. The ground pattern 14a does not cover a region between the receiving chip antennas 10c and 10d or a region between the receiving chip antennas 10e and 10f. Assuming that the tips of the antenna elements in the respective receiving antennas 10b to 10f are directed as described above, a gap not smaller than λ/4 with the ground pattern 14a may be provided above the receiving chip antenna 10c as viewed in FIG. 6. However, considering the need for compact design of the printed board 16 and for providing a space below the receiving chip antenna 10c, only a minimum gap with the ground pattern 14a is provided in the arrangement shown in FIG. 6. The shape of the ground pattern 14a is not limited to the shape shown in FIG. 6, and may be modified as desired so as to maximize receiving characteristics of the receiving chip antennas 10b to 10f.

The transmitting chip antenna 10a is disposed along an upper edge of the printed board 16, with a certain gap with a transmitting ground pattern 14b having a width longer than the longer edges of the transmitting chip antenna 10a. In order that the transmitting chip antenna 10a and the ground pattern 14b together function as a vertically polarized antenna, the ground pattern 14b extends in a vertical direction (assuming that the ground is downward as viewed in FIG. 6), preferably with a length L of λ/4 in the vertical direction. As described earlier, the ground pattern 14b is separated from the ground pattern 14a so that the receiving chip antenna 10b and the transmitting chip antenna 10a, the ground pattern 14b and the receiving chip antenna 10b, or the ground pattern 14b and the ground pattern 14a are separated by a certain distance.

According to the diversity antenna apparatus constructed as described above, the transmitting chip antenna 10a emits vertically polarized radio waves strongly, so that the components of the vertically polarized radio waves emitted into space can be efficiently received by receiving chip antennas of another diversity antenna apparatus. Accordingly, reduction in diversity gain can be prevented. Therefore, the diversity antenna apparatus is suitable for use in multipath environments.

Figure 7:
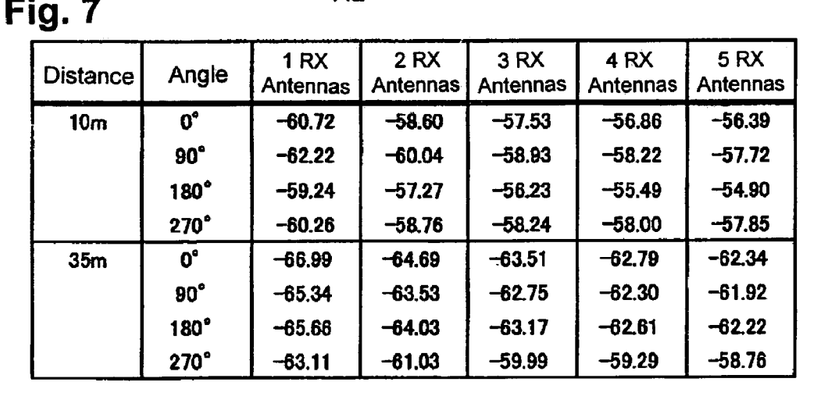
FIG. 7 is a table showing examples of receiving characteristics of the diversity antenna apparatus shown in FIG. 6.

FIG. 7 shows the results of an experiment in which two diversity antenna apparatuses constructed as shown in FIG. 6 were used, wherein the two diversity antenna apparatuses are disposed at a mutual distance of 10 m or 35 m, the transmitting chip antenna of one of the diversity antenna apparatuses outputting radio waves of 13 dBm at 5.25 GHz and the receiving chip antennas of the other diversity antenna apparatus receiving the radio waves. This experiment was carried out in a typical office environment. In this experiment, assuming that the diversity antenna apparatuses make an angle of 0° when opposed to each other, the receiving diversity antenna apparatus was rotated by 0°, 90°, 180°, and 270°, and for each of the rotation angles, average values (dB) of the voltage received were measured using one, two, three, four, and five receiving chip antennas. In all cases, the variation in the average value of the voltage received was as small as approximately 2 dB even when the number of receiving chip antennas was changed. Furthermore, the variation in the average value of voltage received was as small as approximately 3.5 dB even when the angle was changed. As described above, variation in the receiving characteristics is small, so that favorable communications are allowed even in multipath environments.

In the above, one transmitting chip is used whereas five receiving chip antennas are used, thereby achieving diversity in receiving. However, similarly, diversity in transmitting can be realized by using multiple transmitting chip antennas. The number of receiving antennas and transmitting antennas may be selected depending on its intended use of the diversity device. Further, when rendering a transmitting antenna vertically polarized, the device can have one transmitting chip antenna and one receiving chip antenna.

Figure 8:
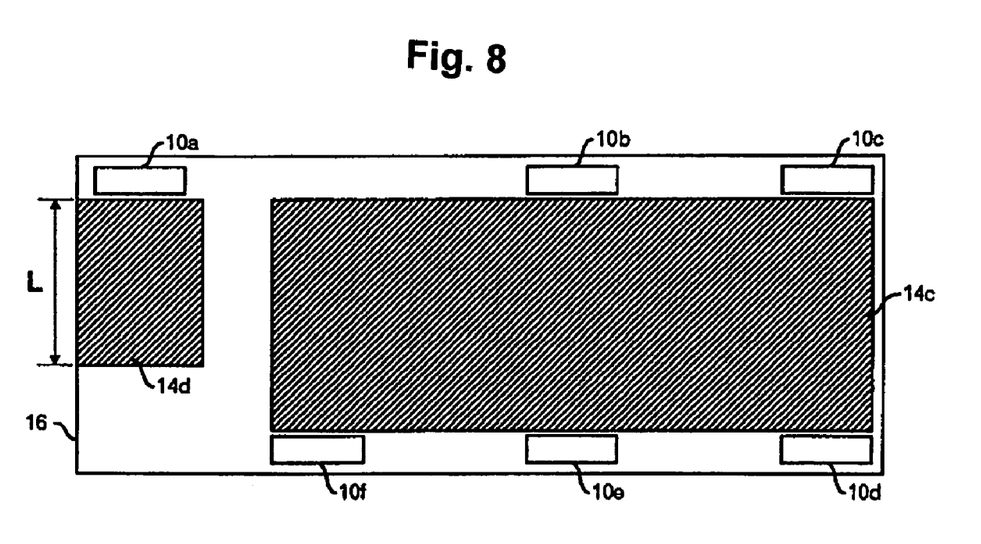
FIG. 8 is a schematic top view of a diversity antenna apparatus according to a modification of the second embodiment of the present invention.

FIG. 8 shows a modification of the second embodiment. In the modification shown in FIG. 8, receiving antennas 10b to 10f are disposed along the outer edges of the printed board 16 so as to surround a receiving ground pattern 14c that is disposed in a substantially central region of the printed board 16, with a certain gap from the ground pattern 14c. Similarly to the arrangement described earlier, the gap between the receiving chip antenna 10b and the receiving chip antenna 10c and the gap between the receiving chip antenna 10e and the receiving chip antenna 10d are not smaller than λ/4. The shape of the ground pattern 14c is rectangular in this modification, but the ground pattern 14c may have other shapes. However, preferably, the ground pattern 14c does not cover a region between the receiving chip antennas 10b and 10c, a region between the receiving chip antennas 10f and 10e, or a region between the receiving chip antennas 10e and 10d.

In the modification shown in FIG. 8, similarly to the arrangement described earlier, a ground pattern 14d is provided separately from the ground pattern 14c, and the ground pattern 14d extends in a vertical direction (assuming that the ground is downward as viewed in FIG. 8), preferably with a length L not smaller than λ/4 in the vertical direction. The width of the ground pattern 14d is longer than the longer edges of the transmitting chip antenna 10a. The transmitting chip antenna 10a is disposed in association with the ground pattern 14d along an outer edge of the printed board 16. The receiving chip antenna 10b and the transmitting chip antenna 10a are disposed with a mutual gap not smaller than λ/4.

Although connections of hybrid patterns for the receiving chip antennas 10b to 10f are not shown, the chip antennas can be combined as desired, and a hybrid pattern may be connected for each set of chip antennas.

Although the present invention has been described in the context of preferred embodiments, the present invention is not limited to the embodiments described above. That is, other arrangements, connecting patterns, and the like incorporating the features described above can be employed. Furthermore, measurement results such as the results shown in FIG. 7 depend on the multipath environment used, and the results shown in FIG. 7 are not necessarily obtained in other multipath environments as well.

This application claims priority to Japanese Patent Application Nos. 2003-108176 and 2004-042662, the disclosure of which is incorporated herein by reference in their entirety.

What is claimed is:

1. A diversity antenna apparatus comprising:
 a plurality of antenna elements disposed on a substrate; and
 a ground pattern formed in or on the substrate, the ground pattern functioning together with each of the antenna elements;
 wherein the ground pattern is formed at a central region of the substrate with a gap from each of the antenna elements, and wherein the antenna elements are disposed along outer edges of the substrate and/or the ground pattern so as to surround the ground patterns,
 wherein the ground pattern has at least one side edge along which at least two of the antenna elements are disposed with tips thereof directed in the same direction and with spaces provided adjacent to and in the directions of the respective tips of the antenna elements.

2. A diversity antenna apparatus according to claim 1, wherein the antenna elements are disposed with mutual gaps that are not smaller than one quarter of a wavelength associated with a resonant frequency.

3. A diversity antenna apparatus according to claim 1, wherein the antenna elements are formed as rectangular chip antennas, the chip antennas being arranged in at least two arrangements including a first arrangement in which a chip antenna is disposed laterally along a first edge of the substrate, and a second arrangement in which a chip antenna is disposed longitudinally along a second edge of the substrate, the second edge being perpendicular to the first edge.

4. A diversity antenna apparatus according to claim 1, wherein the antenna elements are formed as chip antennas having element tips extending in a common direction as viewed from within the ground pattern, and wherein the ground pattern is formed such that a space is provided in the direction of the element tip of each of the chip antennas.

5. A diversity antenna apparatus according to claim 1, wherein the substrate further comprises a hybrid pattern that is connected to at least two of the plurality of antenna elements.

6. A diversity antenna apparatus according to claim 5, wherein the substrate is composed of a lamination of a hybrid layer including the hybrid pattern, a connecting layer including a connecting pattern for connecting the hybrid pattern to an external port, and a ground layer including the ground pattern, and wherein the ground pattern is arranged between the hybrid layer and the connecting layer to form a microstrip-line structure, and shares the ground layer with the plurality of antenna elements.

7. A diversity antenna apparatus according to claim 1, wherein the ground pattern has another side edge along which at least two of the antenna elements are disposed with tips thereof directed in the same direction and with spaces provided adjacent to and in the directions of the respective tips of the antenna elements.

8. A diversity antenna apparatus comprising:
 a plurality of antenna elements disposed on a substrate, among which switching is allowed; and
 a ground pattern formed in or on the substrate, the ground pattern functioning together with each of the plurality of antenna elements;
 wherein the ground pattern is formed at a central region of the substrate with a gap from each of the antenna elements, wherein the antenna elements are disposed on the substrate so as to surround the ground pattern, and wherein the ground pattern and the antenna elements are disposed in parallel to a mounting surface of the substrates,
 wherein the ground pattern has at least one side edge along which at least two of the antenna elements are disposed with tips thereof directed in the same direction and with spaces provided adjacent to and in the directions of the respective tips of the antenna elements.

9. A diversity antenna apparatus comprising:
 a plurality of antenna elements disposed on a substrate; and
 a ground pattern formed in or on the substrate, the ground pattern functioning together with each of the plurality of antenna elements;
 wherein the ground pattern is formed at a central region of the substrate with a gap from each of the antenna elements, and wherein the antenna elements surround the ground pattern,
 wherein the plurality of antenna elements comprises an antenna element dedicated for transmitting and an antenna element dedicated for receiving,
 wherein the ground pattern has at least one side edge along which at least two of the antenna elements are disposed with tips thereof directed in the same direction and with spaces provided adjacent to and in the directions of the respective tips of the antenna elements.

10. A diversity antenna apparatus according to claim 9, wherein the antenna element dedicated for transmitting functions as a vertically polarized antenna.

11. A diversity antenna apparatus according to claim 9, wherein the ground pattern conmprises a first region that functions as a ground for the antenna element dedicated for transmitting and a second region that functions as a ground for the antenna element dedicated for receiving.

12. A diversity antenna apparatus according to claim 11, wherein the first region extends in a vertical direction.

13. A diversity antenna apparatus comprising:
- a plurality of antenna elements disposed on a substrate; and
- a ground pattern formed in or on the substrate, the ground pattern functioning together with each of the plurality of antenna elements;
- wherein the plurality of antenna elements comprises an antenna element dedicated for transmitting and an antenna element dedicated for receiving,
- wherein the ground pattern has at least one side edge along which at least two of the antenna elements are disposed with tips thereof directed in the same direction and with spaces provided adjacent to and in the directions of the respective tips of the antenna elements.

14. A diversity antenna apparatus according to claim 13, wherein the antenna element dedicated for transmitting is a vertically polarized antenna element.

15. A diversity antenna apparatus comprising:
- a plurality of chip-type antenna elements disposed on a plane of a substrate;
- a ground pattern formed in or on the substrate substantially in parallel with the plane to establish an electromagnetic coupling with the antenna elements, wherein all of the antenna elements are disposed outside an outer periphery of the ground pattern; and
- a connecting pattern formed in or on the substrate which is connected to the antenna elements to conduct switching among the antenna elements for diversity control,
- wherein the ground pattern has at least one side edge along which at least two of the antenna elements are disposed with tips thereof directed in the same direction and with spaces provided adjacent to and in the directions of the respective tips of the antenna elements.

16. A diversity antenna apparatus according to claim 15, wherein the antenna elements are disposed along the outer periphery of the ground pattern.

17. A diversity antenna apparatus according to claim 16, wherein the antenna elements are directed in the same general direction along the outer periphery of the ground pattern.

18. A diversity antenna apparatus according to claim 16, wherein the antenna elements are disposed along the outer periphery of the ground pattern which are opposed to each other.

19. A diversity antenna apparatus according to claim 15, further comprising a hybrid pattern formed in or on the substrate connecting one antenna element to another.

20. A diversity antenna apparatus according to claim 15, wherein the ground pattern is comprised of a segment for transmitting and another segment for receiving, which are separated from each other, wherein at least one antenna element is dedicated for transmitting, and at least one antenna element is dedicated for receiving.

21. A diversity antenna apparatus according to claim 18, wherein the segment of the ground pattern for transmitting is such that the antenna element for transmitting serves as a vertically polarized antenna element.

* * * * *

UNITED STATES PATENT AND TRADEMARK OFFICE
CERTIFICATE OF CORRECTION

PATENT NO.      : 7,046,201 B2
APPLICATION NO. : 10/821580
DATED           : May 16, 2006
INVENTOR(S)     : Hironori Okdado Page 1 of 1

It is certified that error appears in the above-identified patent and that said Letters Patent is hereby corrected as shown below:

On the title page: Item [75], delete "Okada," and insert -- Okado,--, therefor.

Sheet 3 of 6 Drawings, Fig. 4A, delete "2a" and insert --12a--, therefor.

Sheet 3 of 6 Drawings, Fig 4A, delete "2b" and insert --12b--, therefor.

Column 1, line 9, delete "Descripton" and insert --Description--, therefor.

Column 3, line 60, delete "wherein." And insert --wherein--, therefor.

Column 3, line 63, delete "tips," and insert --tips--, therefor.

Column 3, line 63, delete "extending." And insert --extending--, therefor.

Column 4, line 42, delete "antenna-element" and insert --antenna element--, therefor.

Column 7, line 34, delete "limited,to" and insert --limited to--, therefor.

Column 8, line 50, delete "an d" and insert --and--, therefor.

Column 9, line 34, delete "from-the" and insert --from the--, therefor.

Column 11, line 50, In Claim 1, delete "patterns," and insert --pattern,--, therefor.

Column 12, line 38, In Claim 8, delete "substrates," and insert --substrate,--, therefor.

Column 12, line 66, In Claim 11, delete "conmprises" and insert --comprises--, therefor.

Signed and Sealed this

Second Day of January, 2007

JON W. DUDAS
*Director of the United States Patent and Trademark Office*